J. WEBSTER.
Peat Machine.
No. 68,016.   Patented Aug. 20, 1867.
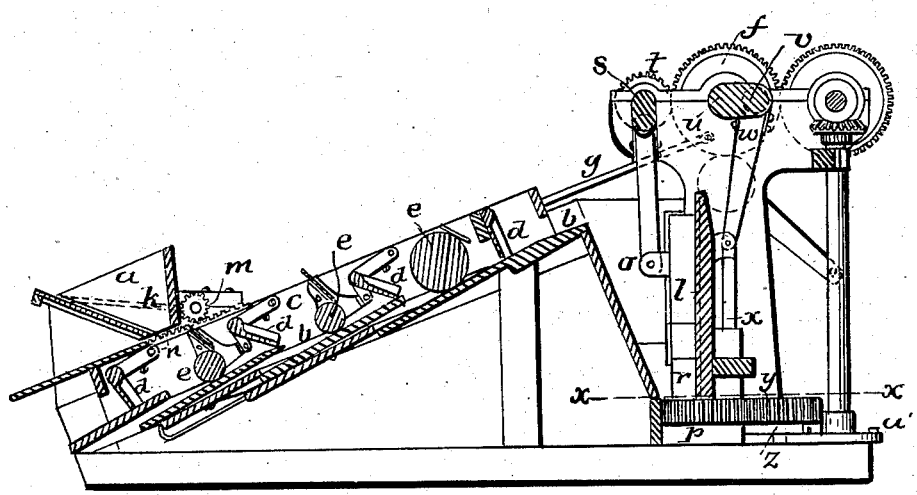
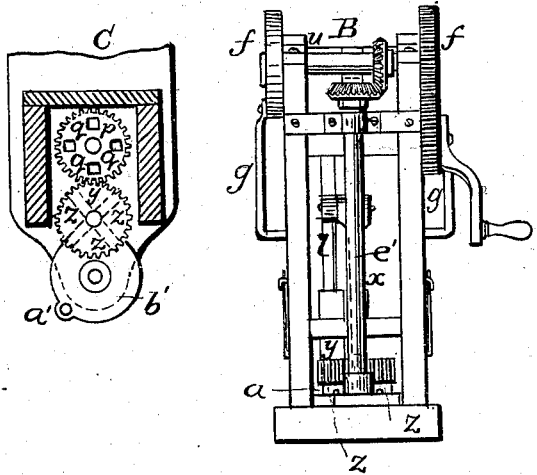
Witnesses:
S. B. Kidder.
M. W. Frothingham.
Inventor:
Joshua Webster
by his Attys
Crosby Halsted & Gould

United States Patent Office.

JOSHUA WEBSTER, OF MALDEN, MASSACHUSETTS.

Letters Patent No. 68,016, dated August 20, 1867.

---

IMPROVED APPARATUS FOR PREPARING PEAT FOR FUEL.

---

The Schedule referred to in these Letters Patent and making part of the same.

---

TO ALL WHOM IT MAY CONCERN:

Be it known that I, JOSHUA WEBSTER, of Malden, in the county of Middlesex, and State of Massachusetts, have invented an improved Machine for Preparing Peat for Fuel; and I do hereby declare that the following, taken in connection with the drawings, which accompany and form part of this specification, is a description of my invention, sufficient to enable those skilled in the art to practise it.

United States Letters Patent, No. 61,586, were granted to me January 29, 1867, for an improved machine to be used in preparing peat for fuel, the essential feature of which consists in the employment, in connection with a feed or peat receiving and delivering hopper, of an inclined trough or box, a system of reciprocating followers or scrapers, which gradually force the peat up the incline, and a series of presser-rollers, which express the water from the peat, the water running down the incline and being discharged therefrom at its lower end, or through outlets formed through the bottom.

My present invention relates to an arrangement, in connection with such peat-treating mechanism, of a mechanism for receiving the peat from the upper or delivering end of the incline, and compressing and moulding the same into portable or brick-like blocks.

The invention consists in combining, with the reciprocating scrapers and presser-rolls, working upon the incline or trough, a hopper for receiving the peat therefrom, at the bottom of which hopper is a wheel containing a series of pockets or mould-cells, into which the peat in the hopper is forced by a follower, this wheel having an intermittent rotative movement, such that, in connection with the descent of the plunger to force peat into the mould, another plunger or piston descends to enter the mould last filled, and compress the peat within the same, while a third discharging piston descends and expels the compressed block of peat from the mould previously filled, or that in advance of the compresser plunger, the wheel having been rotated to bring the two filled moulds into positions to be thus acted upon by the compressing and the discharging pistons.

The drawings represent a machine embodying the invention—

A showing a vertical longitudinal section thereof, and B an end elevation. C is a horizontal section on the line $x\ x$.

$a$ denotes the crude-peat hopper, placed at the lower end of a long incline or trough, $b$, suitably supported in position, as seen at A, the hopper, by the action of a reciprocating plunger, $c'$, discharging the peat thrown into it upon the lower end of the incline. In or over this trough or incline, a reciprocating frame or carriage, $c$, works, this carriage supporting a series of scrapers, $d\ d$, and a series of presser-rolls, $e\ e$, the scrapers and rollers being arranged and acting upon the peat, substantially as described in my patent to which reference has been made. The carriage $c$ is reciprocated from a gear-wheel, $f$, by a link or connecting-rod, $g$, jointed at one end to the carriage, and at its opposite end to the wheel $f$, as shown at A, and the hopper plunger is reciprocated by crank-wheels $i$ and links $k$, the crank-wheel shaft carrying gear-pinions $m$, meshing into and driven in opposite directions by gear-racks $n$ on the carriage $c$. The upper scraper forces the peat from the top of the incline into the top of a hopper or mill, $o$, the sides of which contract at the bottom, the mill discharging at bottom upon a horizontal wheel, $p$, in which is a series of moulds, $q$. In the mill is a vertically reciprocating plunger, $r$, connected to and driven from a crank-shaft, $s$, said shaft carrying a gear, $t$, meshing into and driven by the gear $f$, the latter being driven by any suitable power. At each downward movement of the plunger $r$, a mould in the wheel is directly under it, so that the peat beneath the plunger is forced into and fills the mould, and is partially compressed or solidified therein, as will be readily understood. On the shaft $u$, carrying the gear $f$, is a crank, $v$, to which is jointed, by a link, $w$, a vertical plunger, $x$, which, at each descent, is forced into the mould last filled by the plunger $r$, and compresses and condenses the peat therein. Connected to this plunger is another plunger or clearer, $l$, which descends simultaneously with the compressing plunger $x$, and enters the mould in advance of that in which the peat is compressed, and expels therefrom the compressed block of peat. To bring each empty mould, each filled mould, and each mould containing the compressed peat in turn under the respective plungers $r$, $x$, and $l$, a mechanism is employed, as follows: The mould-wheel $p$ meshes into and is rotated horizontally by a gear-wheel, $y$, having radial slots $z$, into which, intermittently, a pin, $a'$, on a wheel, $b'$, works, this wheel being fixed upon a vertical shaft, $e'$, connected by suitable gearing with and driven by the gear $f$. The shaft $e'$ rotates continuously, and as the pin $a'$, in its rotation, comes against the wheel $y$ it enters one of the slots $z$, and turns the wheel $y$, bringing the mould last filled under the compressing plunger $x$, the empty one in rear of it under the filling plunger $r$, and the one in advance of it under the clearing plunger $l$, the pin $a'$, as the moulds reach these positions, departing from the slot, and rotating round to the next slot, the movement of the mould-wheel taking place while the plungers are all above it, and said wheel remaining stationary while the plungers are descending, or while the pin $a'$ is rotating from one slot to the next. Each mould, when the discharger is descending into it, is over a recess formed in the bed or platform of the machine, and the compressed peat-blocks are forced through the same into any suitable receptacle placed beneath. A series of filling, compressing, and discharging plungers may be hung to the respective crank-shafts, and the arrangement of the mechanism which drives them may be varied in accordance with the number and position of the plungers, or of the moulds. The filling-plunger is shown as arranged to descend twice at each descent of the compressing and discharging plungers, the mould-wheel being stationary during both of such movements of the filling-plunger; but this relation may of course be varied as circumstances may render desirable.

With a machine thus constructed and arranged, the peat, after having the water expressed therefrom through the successive action of the various scrapers and presser-rolls, is readily condensed and brought into portable condition and shape by the plungers and moulds, whereas it is impractical to effect such compression upon any peat from which a large percentage of the water has not been previously removed.

I claim, in combination with the incline, and its system of feeding-scrapers and presser-rolls, the filling, compressing, and discharging plungers, arranged to operate substantially as set forth.

Also, the arrangement of the mechanism for intermittently bringing the respective filled and empty moulds into position under the respective filling, compressing, and discharging plungers, substantially as shown and described.

JOSHUA WEBSTER.

Witnesses:
　J. B. CROSBY,
　FRANCIS GOULD.